June 12, 1951     J. OSWALD     2,556,776
SPOTLIGHT

Filed July 3, 1948                               2 Sheets-Sheet 1

JOHN OSWALD
INVENTOR.

BY E. C. McRae
J. R. Faulkner
F. H. Oster

ATTORNEYS

June 12, 1951 J. OSWALD 2,556,776
SPOTLIGHT
Filed July 3, 1948 2 Sheets-Sheet 2
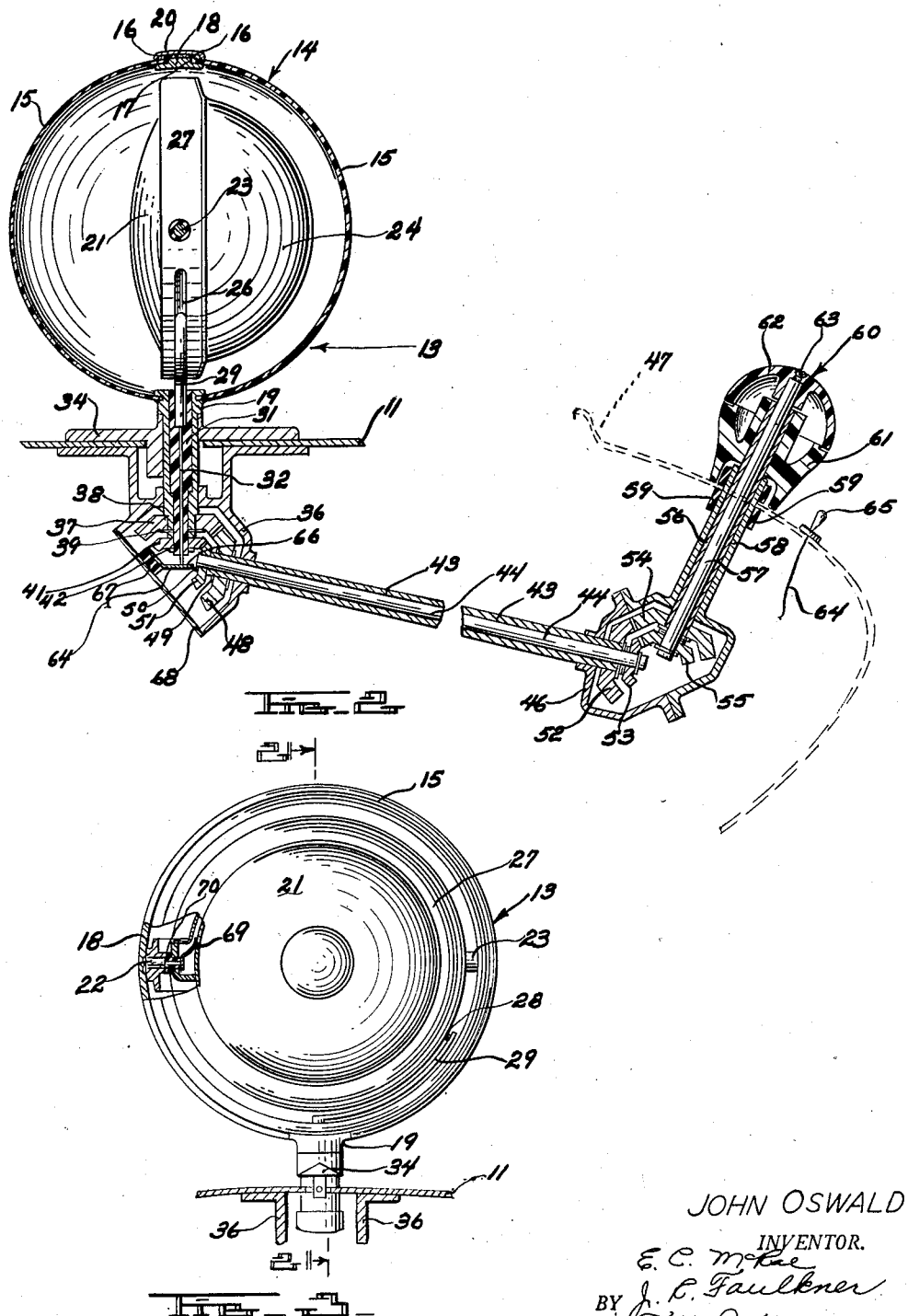
JOHN OSWALD
INVENTOR.
BY E. C. McRae
J. C. Faulkner
G. H. Oster
ATTORNEYS Patented June 12, 1951

2,556,776

UNITED STATES PATENT OFFICE 2,556,776

SPOTLIGHT

John Oswald, Detroit, Mich., assignor to Ford Motor Company, Dearborn, Mich., a corporation of Delaware Application July 3, 1948, Serial No. 36,971

1 Claim. (Cl. 240—61.13)

This invention relates to auxiliary driving lights for automotive vehicles and more particularly to an adjustable spotlight.

The trend in modern automotive design is toward a lower, broader vehicle having picture windows to provide better visibility than has heretofore been obtained. Consequently the front corner posts are being made thinner to provide a wider windshield and also to cut to a minimum the blind spot caused by thick corner posts. In the past it has been the customary practice of the industry to mount spotlights on the corner posts of automotive vehicles. This was done because of the ease of installation and also because the control mechanism for operating the light could be contained in a single shaft. Mounting the spotlight on the corner posts of the newer vehicles is impractical as the corner post, and consequently the roof structure, is seriously weakened when a large enough hole is drilled through it to permit mounting of the spotlight.

It is therefore an object of this invention to provide a spotlight that may be mounted on a fender of the vehicle, or on some other surface of the vehicle.

Another object of this invention is to provide a spotlight unit that permits directive control of the light beam in both a vertical and horizontal plane, such directive control being obtained by a single control knob located within the vehicle.

A further object of the invention is to provide an operating mechanism which is readily adaptable to mass production at a low cost.

Other objects and advantages of the invention will be more apparent as the description proceeds, especially in view of the drawings in which:

Figure 2 is a cross-sectional view of the spotlight taken substantially on the line 2—2 of Figure 3 showing the operating mechanism of the spotlight.

Figure 3 is a front elevational view of the spotlight with a portion broken away to show the method of grounding the electrical circuit.

Figure 1:
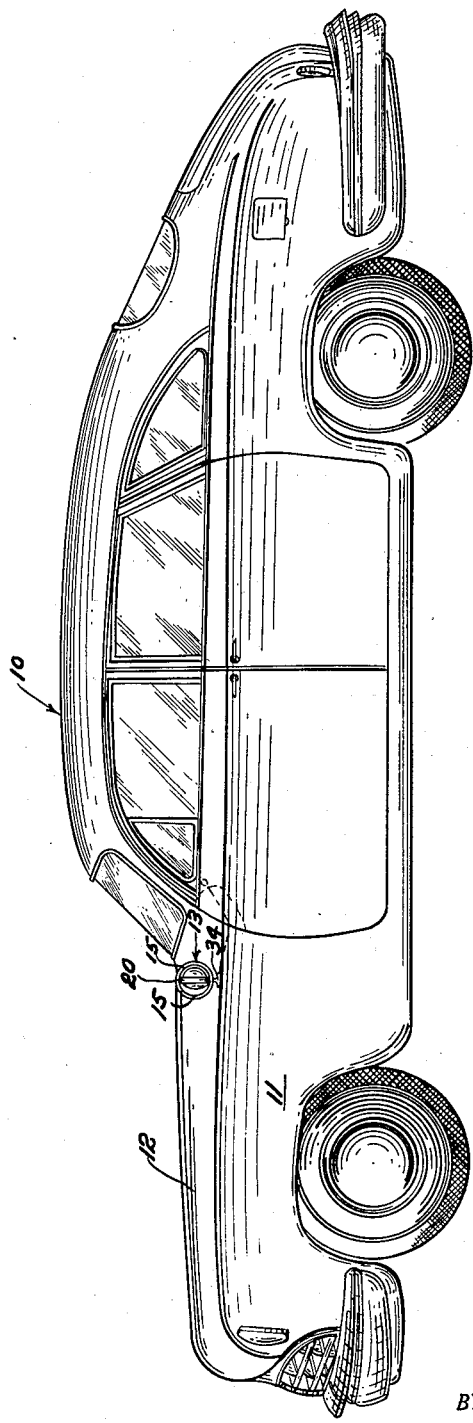
Figure 1 is a side elevation of the front portion of an automobile with the spotlight mounted on a front fender thereof.

Looking now more particularly to the drawings, the reference character 10 denotes an automotive vehicle having a front fender 11, and a hood 12. A spotlight 13 is mounted on the front fender 11 as shown in Figure 1.

As best shown in Figure 2, the spotlight 13 has a spherical outer cover 14 formed in two parts 15 of some clear and transparent substance. For utility and forming characteristics, a clear plastic has been found most satisfactory in forming the two cover halves 15. The two cover halves 15 have outwardly extending flanged portions 16 adapted to fit into the grooves 17 formed in the metal supporting ring 18 which encircles equatorially the spherical cover 14. The supporting ring 18 is die-cast and is an integral part of the hollow mounting shaft 19. A highly finished rim 20, the edges of which are curved inwardly as shown in Figure 2, covers the metal ring 18. The curved edges abut the flanged portions 16 formed in the spherical halves 15 holding them securely in place.

A sealed beam light unit 21, encased in a highly finished shell 24, is pivotally secured to the supporting ring 18 by the pivot pins 22 and 23. A groove 26 has been formed on the lower portion of the shell rim 27 to slidably engage the pin 28 which is secured at one end of the actuating member 29. The other end of the actuating member 29 is secured to a control shaft 31. It will be noted that the groove 26 has been shown in the drawings on the underside of the shell rim 27, but it will be understood that the groove could be formed on other portions of the shell 24 with the same effect.

The control shaft 31 is formed of an electrical nonconductor and is rotatably mounted in the hollow mounting shaft 19. Extending downwardly from the actuating member 29 is an elongated electrode 32, which is securely embedded in the control shaft 31, and extends into the gear case 36. The hollow mounting shaft 19 is rotatably mounted in the bracket 34. As best shown in Figure 2, the mounting shaft 19 and control shaft 31 extend downwardly into the gear case 36. The gear case 36 and the bracket 34 are secured to the fender 11 by screws, bolts, or other conventional means.

A bevel gear 37 is keyed to the mounting shaft 19 to impart rotating movement to the shaft as the bevel gear 37 is operated. The gear 37 is positioned against a shoulder 38 formed on the mounting shaft 19 and is held securely in that position by a snap ring 39.

A smaller bevel gear 41 is keyed to the control shaft 33 to impart rotating movement to the shaft 33 as the gear 41 is operated. The gear 41 is positioned against the end of the mounting shaft 19 and is held in that position by the snap ring 42.

A sleeve 43 and a shaft 44, which are rotatably mounted in the sleeve 43, extend angularly from the gear case 36 located under the fender 11 to a smaller gear case 46 located under the dashboard 47 of the vehicle. The gear case 46 is secured in a conventional manner to the dashboard 47. The sleeve 43 and shaft 44 are angularly disposed to the shafts 19 and 33 to enable proper clearance from the gear case 36 through the side panel and cowl member of the vehicle.

A bevel gear 48 is keyed to one end of the sleeve 43 and secured in position by a snap ring 49. The gear 48 is in mesh with the bevel gear 37 on the shaft 19. Another bevel gear 51 is positioned on the shaft 44, and is secured in place by the snap ring 50. The gear 51 is aligned and in mesh with the bevel year 41 which is secured to the control shaft 31.

Bevel gears 52 and 53 are similarly secured to the opposite ends of the respective sleeve 43 and shaft 44. The bevel gears 52 and 53 are in engagement with the bevel gears 54 and 55 respectively. The bevel gear 54 is secured to the hollow shaft 56 while the gear 55 is securely keyed in a nonrotatable manner on the inner shaft 57, which is rotatably mounted in the hollow shaft 56. It will be noted that the shaft 56 is rotatably mounted in a tube 58 which is an integral part of the gear case 46. The tube portion 58 extends upwardly from the gear case and through a hole provided in the dashboard 47. Antisqueak fittings 59 between the tube 58 and the dashboard 47 prevent any squeaking or rattling of the control mechanism due to the jars and jolts imparted to the frame of the vehicle.

A single control handle 60 comprising a lower portion 61 and an upper portion 62 is secured to the shafts 56 and 57. The lower portion 61 of the control handle 60 is secured to the hollow shaft 56 by conventional means such as keying, or by a lock screw (not shown). The upper portion 62 of the handle is similarly secured to the shaft 57 and is held in position by the screw 63 which is threaded into the shaft 57.

Electrical current is supplied to the light unit 21 by the wire conductor 64 which is secured at one end to the switch 65 and at the other end to the conductor plate 66 which is mounted on an insulating block 67 secured to the cover plate 68 of the gear case 36.

It will be noted that the actuating member 29 and the electrode 32, which may be formed in one integral unit, are formed of an electrical conducting material. It will also be noted that the lower end of the elongated electrode 32 is in positive contact with the conductor plate 66. Current therefore is supplied through the conductor wire 64 to the plate 66 and then through the elongated electrode 32 to the actuating member 29 and the pin 28. A conducting wire (not shown) is secured at one end to the end of the pin 28 and at the other end to a terminal on the bulb (not shown). The lamp bulb is grounded to the sealed beam unit which has a conductor 69 secured to it, as shown in Figure 3. One end of the conductor 69 is in constant contact with the pivot pin 22 which secures the light unit 21 to the supporting ring 18. It will be noted that the pivot pin 22 is insulated from the light shell 24 by the insulating bearing 70. The grounding of the light unit is therefore from the light bulb to the sealed beam unit, through the conductor 69 which grounds the current through the pivot pin 22 to the supporting ring 18 and thus to the frame of the vehicle.

Horizontal movement of the spotlight 13 is accomplished by turning the lower portion 61 of the handle 60. The shaft 56 moves in direct ratio with the lower portion 61 of the handle 60 and such motion of the shaft 56 is transmitted to the spotlight 13 through the bevel gears 52 and 54 to the sleeve 43, through the bevel gears 37 to the mounting shaft 19 which is secured to and a part of the metal ring 18. Rotatable movement of the cover 14 and the light unit 21, which is pivotally secured to the cover 14, is thereby attained. Due to the electrical system employed in this invention, the spotlight 13 can be rotated in a complete 360° path in either direction.

Vertical movement of the light unit 21 is obtained when the upper portion 62 of the handle 60 is operated. Movement of the upper portion 62 of the handle 60 is imparted to the shaft 57, to the bevel gears 55 and 53, to the shaft 44, to the bevel gears 51 and 41, to the control shaft 31, and thence to the actuating member 29. The pin 28 secured to the end of the actuating member 29 is slidably engaged in the groove 26 of the shell rim 27. Any movement of the actuating member 29 causes the pin 28 to operate slidably in the groove 26 which in turn causes the light unit 21 to pivot in a vertical plane. It will be noted that in rotating the spotlight the light unit 21 and the cover 14 rotates, but that in pivotal movement only the light unit 21 is operable.

It will be noted that the spotlight shown and described is adapted to be mounted upon the fender of an automobile, but it will be understood that the invention is equally adaptable to other surfaces of an automotive vehicle by modifying the shafts and the angle of the bevel gears.

It will be understood that the invention is not limited to the specific structure shown and described, but that various changes and modifications may be made without departing from the spirit and scope of the invention as defined in the appended claim.

What is claimed is:

A spotlight for a motor vehicle comprising a bracket adapted to be secured to a portion of said motor vehicle, a hollow sleeve extending vertically through said bracket and journaled therein for full 360 degree rotation, a ring formed integrally with the upper end of said hollow sleeve and having annular shoulders on opposite sides thereof, a pair of hollow hemispherical transparent covers supported upon said ring with their marginal edges seated in said annular grooves, a second ring encircling said first ring and clamping said hemispherical covers thereon, a control shaft formed of an electrical insulating material rotatably mounted within said sleeve and projecting beyond the lower end thereof, a pair of bevel gears secured respectively to the lower ends of said sleeve and said shaft for selective rotation of the latter, a pair of horizontal trunnions extending inwardly from opposite sides of said first ring, a light unit within said pair of transparent covers, an annular rim supporting said light unit and journaled upon said trunnions for swinging movement about a horizontal axis, said rim having an elongated groove formed in its periphery, an actuating member having a shank coaxial with said insulated control shaft and extending into one end thereof for rotation therewith as a unit, said actuating member also having a crank arm extending from said shank and carrying a pin at its end slidably arranged in the peripheral groove of said light unit rim so that rotation of said control shaft operates said crank arm to rotate said light unit about the horizontal axis of said trunnions, said light unit rim, shank, crank arm and pin being formed of metal, an elongated electrode coaxially embedded in said insulated control shaft with its upper end in contact with the shank of said actuating member and its lower end projecting beyond the lower end of said control shaft, a stationary conductor plate carried by said bracket and contacting the lower end of said electrode to form an electrical path including said conductor plate, said electrode, said shank, said crank arm and said pin, and switch means mounted upon said motor vehicle and connected to said conductor plate.

JOHN OSWALD.

REFERENCES CITED

The following references are of record in the file of this patent:

UNITED STATES PATENTS

| Number | Name | Date |
|---|---|---|
| 1,388,220 | Thompson | Aug. 23, 1921 |
| 1,442,189 | Strausbaugh et al. | Jan. 16, 1923 |
| 1,447,589 | Leech et al. | Mar. 6, 1923 |
| 1,751,863 | Hummert | Mar. 25, 1930 |
| 1,756,531 | Aldeen et al. | Apr. 29, 1930 |
| 1,794,166 | Gehrig | Feb. 24, 1931 |
| 2,191,049 | Thornblom | Feb. 20, 1940 |